No. 782,232. Patented February 14, 1905.

UNITED STATES PATENT OFFICE.

BENJAMIN FULTON GARDNER, OF CHICAGO, ILLINOIS, ASSIGNOR OF ONE-HALF TO CHARLES K. WOOLNER AND SIGMUND WOOLNER, OF CHICAGO, ILLINOIS.

COMPOSITION OF MATTER AND PROCESS OF MAKING IT.

SPECIFICATION forming part of Letters Patent No. 782,232, dated February 14, 1905.

Application filed May 9, 1904. Serial No. 207,111.

*To all whom it may concern:*

Be it known that I, BENJAMIN FULTON GARDNER, a citizen of the United States, residing at Chicago, in the county of Cook and State of Illinois, have invented certain new and useful Improvements in Composition of Matter and Processes of Making It, of which the following is a specification.

This invention relates to a composition of matter which is capable of extensive use for a great variety of purposes in many different arts and also to the process of making it.

The object of this invention is primarily to provide an electric-resistance material for use in heaters, rheostats, controllers, switchboards, &c.; but the composition is capable of many other uses.

In preparing the composition I use graphite, carborundum and sulfur of commerce, and commercially-pure rubber, and I have found that the composition can be successfully made with the proportions of fifty per cent. graphite, twenty-five per cent. carborundum, twenty per cent. rubber, and five per cent. sulfur; but I do not confine myself to these proportions, as they can be varied in many respects to change the character of the composition and reduce or increase its electric resistance. I first thoroughly mix the carborundum, graphite, and sulfur in a dry state. I then pass the rubber through heated rolls which travel at a differential speed to reduce it to a soft waxy condition, and then the above mixture is thrown onto the rubber and the rolling continued until this mixture is thoroughly united with the rubber. The rubber is passed repeatedly through a single set of heated rollers, or it can be carried through a series of heated rollers, and the mixture can be distributed on the rubber in any suitable manner by any suitable means. Other means can be employed for producing the composition in or about the manner heretofore described. When the composition comes from the rolls, it is soft and flexible and can be calendered to any degree of thickness or molded into any form and vulcanized by the usual method to make it hard. I subject the composition to a carbonizing process of any suitable character after it is vulcanized. One process of carbonization is to bury the vulcanized composition or article made of the composition in sand and apply heat until all the sulfur is driven off and the rubber is carbonized.

The material if made in sheets or blocks or plates can be easily worked at any stage in its manufacture; but it will probably be found more convenient to mold the material while soft into the form desired and then subject it to the vulcanizing and carbonizing processes.

The rubber is used primarily as a binder to hold the other ingredients together, and the carbonizing process is necessary to drive off all the gases from the composition to adapt it for use as an electric-resistance material. The carbonized material is very hard, dense, and non-fusible and retains the shape in which it has been molded.

In the process of manufacture the rubber could be reduced to the consistency of syrup with gasolene or bisulfid of carbon and then mixed with the other ingredients instead of pursuing the process heretofore described. The degree of resistance can be graduated by varying the proportions of carborundum.

In its vulcanized state the material can be made flexible to a degree for certain purposes and also electroplated. It can be made as soft as vulcanized rubber or as hard as glass. It is about as light in weight as wood. In its finished state it does not expand or contract or shrink and will not split. The material will resist the action of acids and alkali and water at any temperature.

Without limiting myself to the exact proportions or to the process of manufacture herein described, what I claim, and desire to secure by Letters Patent, is—

1. The herein-described composition of matter consisting of a vulcanized and carbonized mixture of graphite, carborundum, sulfur and india-rubber or gutta-percha.

2. The herein-described process of making an electric-resistance material which consists in combining graphite, carborundum, sulfur and india-rubber or gutta-percha; and then vulcanizing and carbonizing the mixture.

BENJAMIN FULTON GARDNER.

Witnesses:
Wm. O. Belt,
Frances B. Allen.